Dec. 13, 1966  R. T. MAIN  3,291,932
PRESSURE RESPONSIVE CONTROL RESET STRUCTURE
Filed Dec. 14, 1964  2 Sheets-Sheet 1

INVENTOR
ROBERT T. MAIN
BY
*[signature]*
ATTORNEY

Dec. 13, 1966   R. T. MAIN   3,291,932
PRESSURE RESPONSIVE CONTROL RESET STRUCTURE
Filed Dec. 14, 1964   2 Sheets-Sheet 2

INVENTOR
ROBERT T. MAIN
By Bayard H. Michael
ATTORNEY

United States Patent Office 3,291,932
Patented Dec. 13, 1966

3,291,932
PRESSURE RESPONSIVE CONTROL RESET
STRUCTURE
Robert T. Main, Arlington Heights, Ill., assignor to Controls Company of America, Melrose Park, Ill., a corporation of Delaware
Filed Dec. 14, 1964, Ser. No. 418,237
8 Claims. (Cl. 200—83)

This invention relates to pressure responsive control devices and particularly to control devices effecting a control function in response to a preselected pressure condition which may, for example, be expressed in terms of the depth of fill of a washing machine. The selecting mechanism for control devices of this type permits selection of a desired fill level in the washing machine and is desirably provided with some means for effecting resetting of the control mechanism when the setting is changed.

The most successful pressure switch in the market place incorporates the so-called positive reset feature of U.S. Patent No. 2,934,618. This patent shows an arrangement whereby one of three levels can be selected by rotation of a selecting cam operated by means of a knob accessible on the exterior of the washing machine. The cam is so shaped that between each of the three level selecting cam portions there is a lobe which will actuate the pressure switch mechanism so as to positively reset the switch. The present invention is concerned with providing a positively resettable pressure switch having provision for selection of any water level between the high and low limits. This, of course requires a continuous cam for actuating the spring loading mechanism on the pressure switch and this, in turn, precludes the use of lobes on the cam for effecting the positive reset when changing from one level to another.

The principal object of this invention is to provide means for resetting a pressure switch having provision for an infinite or continuously variable selection of water level.

Other objects and advantages will be pointed out in, or be apparent from, the specification and claims, as will obvious modifications of the various embodiments shown in the drawings, in which:

Figure 6:
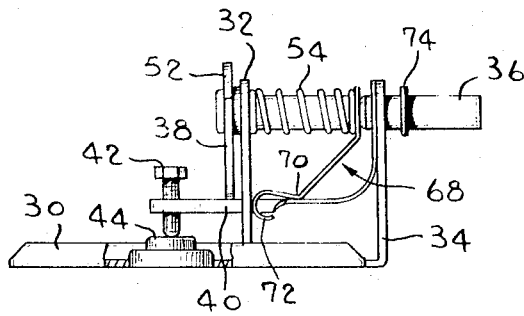
Figure 7:
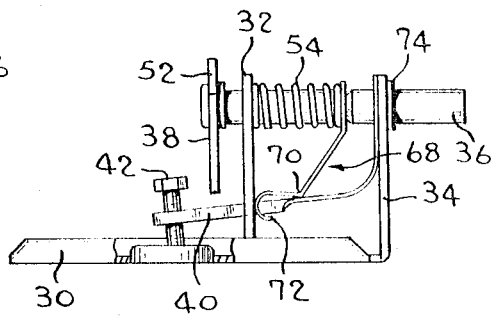
Figure 8:
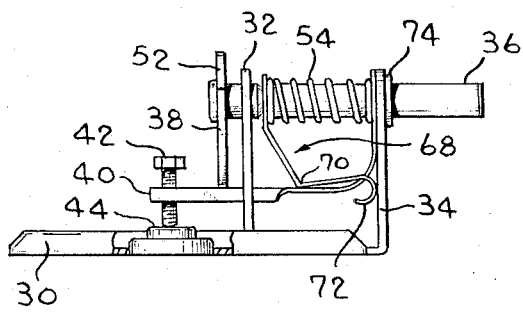
Figure 9:
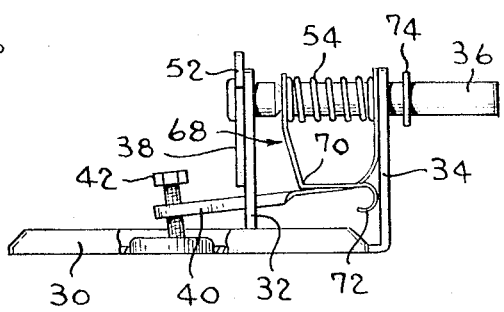

FIG. 6 is a modified form of the push-to-reset design;
FIG. 7 is the resetting position of FIG. 6;
FIG. 8 is a modified pull-to-reset construction; and
FIG. 9 is the resetting position of FIG. 8.

The switch mechanism shown in housing 10 is basically the same as that shown in U.S. Patent 2,934,618. In this form pressure variations are fed into inlet or nipple 12 to act on the underside of diaphragm 14 which is flexed upwardly as the pressure increases. Contact 16 will initially be on the upper stationary contact 18 and as the diaphragm post 20 moves upwardly it takes the center tongue 22 of the switch blade upwardly to move the toggle spring 24 overcenter and snap contact 16 to the lower stationary contact 26. As the pressure is relived under the diaphragm the spring 28 will force the diaphragm to move downwardly until the switch snaps overcenter again and the moving contact 16 again rests on the upper contact 18. The force necessary to snap the switch overcenter is determined by the compressive force of the loading spring 28. Obviously, any such switching arrangement as this must have a switching differential. In other words, it will take one pressure to snap the spring over to the position shown in FIG. 2 and the pressure must then fall off a predetermined amount to snap it back to the initial position. If the selected pressure (level) is to be changed after the switch has snapped overcenter to indicate a full level for the initial selection, the new selection may not be enough to trip the switch back so as to achieve the desired additional fill in the tub, for example. Therefore, it is desirable to provide means for resetting the switch.

Bracket 30 on the top of the housing 10 includes two spaced upright supports or legs 32, 34 which journal shaft 36. This shaft is adapted to carry a knob, not shown, which is to be actuated by the user. The left-hand end of the shaft is provided with a setting cam 38 which acts on the lever 40. This lever is mounted on bracket leg 34 and is fabricated of spring material tending to move the lever upwardly so as to hold the lever against the cam 38. The outer end of the lever is provided with a set screw 42 which is used to calibrate the control. As the shaft 36 is turned the cam 38 is turned and its configuration determines the position of lever 40 and, hence, of screw 42 with respect to the upper end of the plunger or spring support means 44 projecting through the top of housing. The underside of the plunger is provided with a well serving as a seat for loading spring 28 and is also provided with a central nose portion 46 which, when the plunger 44 is moved downwardly far enough, will act against the upper end or nose 48 of the diaphragm pin 20 to force the diaphragm pin downwardly and snap the switch blade overcenter to its initial position.

Figure 1:
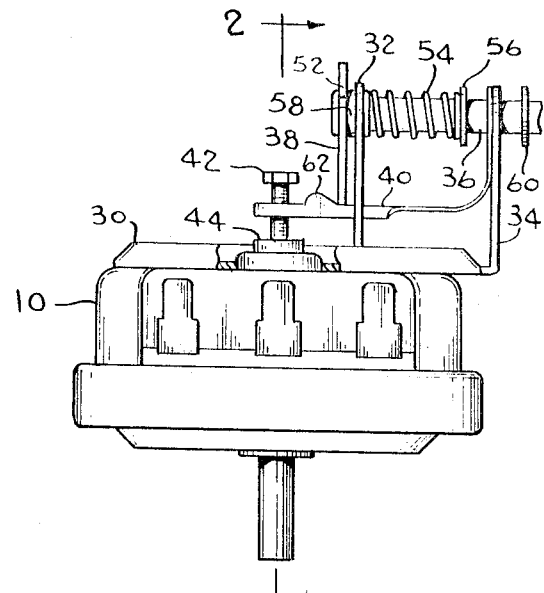
FIG. 1 is a side elevation of one form of the pressure switch in which the actuating shaft is pushed to reset the switch.

It will be noted the cam 38 is provided with abrupt lobes 50, 52 at the extremities of the permissible motion. The cam is so shaped as to give a full range of settings to spring 28 so that an ylevel in the washing machine may be selected between the low and high limits. Obviously, with this sort of arrangement there can be no provision for reset lobes on the cam as was done in the above mentioned Patent 2,934,618. With this in mind the shaft 36 has been mounted for axial movement as well as rotary movement. Thus it will be noted that the spring 54, compressed between leg 32 and shoulder 56 fixed on the shaft, will act to bias the shaft towards the right, as seen in FIG. 1. The limit of movement to the right is determined by engagement of spacer 58 with the left side of leg 32. The shaft 36 can move to the left, as seen in FIG. 1, to the limit determined by engagement of shoulder 60, fixed on the right-hand portion of the shaft, with leg 34, as may be seen in FIG. 3. In this position the active surface of the cam rides up the ramp or cam portion 62 on the top of lever 40 to force the lever down to an extreme position in which the switch will be reset. The cam cannot ride over the top of the ramp 62 and whenever the manual pressure to shaft 36 is relieved, the shaft spring 54 will force the shaft back to its normal position in which the cam determines the load on spring 28 and, hence, the setting of the pressure switch.

Figure 4:
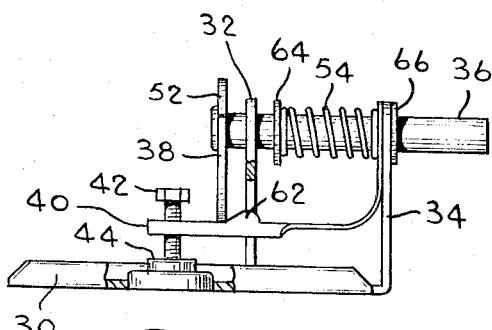
FIG. 4 is a modified form in which the shaft is pulled to reset.
Figure 5:
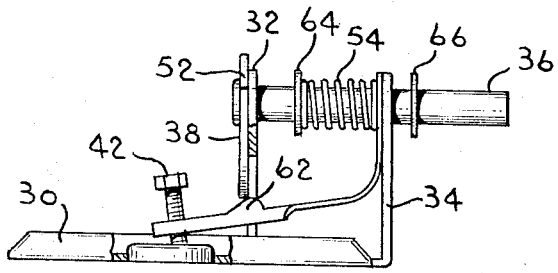
FIG. 5 is a view comparable to FIG. 4 but shows the reset position of this version.

The form of the invention shown in FIG. 4 incorporates a modification whereby the shaft is now biased to the left by the spring 54 acting against shoulder 64 to normally hold the shoulder 66 against the right side of leg 34. The slope on ramp 62 has now been reversed so that when the shaft 36 is pulled, as shown in FIG. 5, the cam 38 will ride up the ramp to force the lever downwardly. Thus the first form of the invention showed a push-to-reset while this form shows a pull-to-reset structure.

Figure 2:
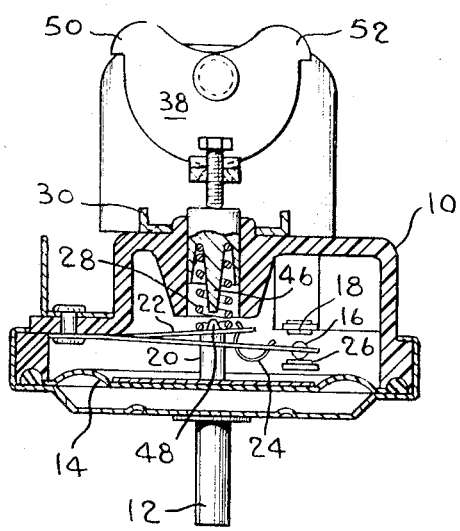
FIG. 2 is a vertical section taken on line 2—2 of FIG. 1.
Figure 3:
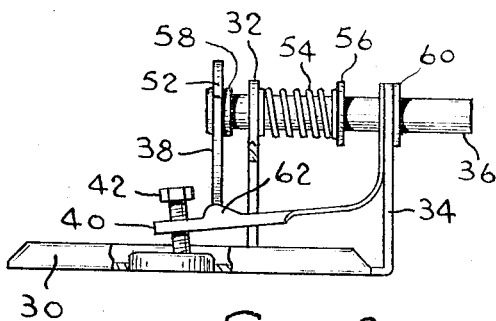
FIG. 3 is a partial view comparable to FIG. 1 showing the reset position of the actuator.

In the form of the invention shown in FIG. 6 the shaft is again biased to the right by means of the spring 54, as indicated with respect to FIGS. 1, 2, and 3. Here, however, there is no ramp on lever 40 but in lieu thereof a reset link 68 is axially fixed (but not rotationally) on the shaft 36 so as to both serve as a seat for spring 54 and to project downwardly to the left so the knee portion 70 rests on top of lever 40 while the curved left end or pivot portion 72 bears against the right side of leg 32. When the shaft 36 is pushed to the limit determined by engagement of shoulder 74 with leg 34 the link obviously cannot move bodily with the shaft since the upper end of the link is axially fixed with respect to the shaft 36. Therefore, the curved end portion will be forced to slide down the right side of leg 32 which, in turn, will force the knee 70 of the link downwardly against lever 40 to force the lever downwardly to the reset position.

In the form of the invention shown in FIG. 8 the action of FIG. 6 is reversed, that is, here we have a pull-to-reset arrangement where link 68 is reversed so that as the shaft 36 is pulled to the right the curved portion or pivot portion 72 will again have to slide down the bracket leg 34 to force the knee 70 against the lever 40 and force the lever 40 down to the reset position.

From the foregoing it will be appreciated that the present variations all provide means for resetting the pressure switch while affording an infinite selection of levels or pressures between the minimum and maximum available in the pressure switch construction. Throughout this description reference has been made to a pressure switch and the specific form shown is a pressure responsive electric switch but it should be appreciated that this design is fully applicable to any control device accomplishing a switching function, whether it be switching electricity or fluids or the like. Therefore, this terminology is not to be construed as limiting the invention to an electric switch.

Although various embodiments of the present invention have been illustrated and described, it will be apparent to those skilled in the art that various changes and modifications may be made therein without departing from the spirit of the invention or from the scope of the appended claims.

I claim:

1. The combination with a control device of the type having a control mechanism movable from one controlling condition to another controlling condition in response to movement of a diaphragm under influence of pressure acting on one side of the diaphragm in opposition to a preselected opposing biasing force, of means for preselecting the biasing force including, cam means rotatable about an axis continuously adjusting the biasing force when rotated, means mounting the cam for rotary and axial movement, and means responsive to axial movement of the cam means to actuate the control mechanism to said one condition.

2. A control including a housing, a diaphragm in the housing with one side exposed to pressure variations, a control device on the other side of the diaphragm and movable by the diaphragm from one control position to another, spring means acting on the diaphragm in opposition to the pressure to determine the pressure necessary to move the control device to said other position, shaft means carried on the housing for rotary and axial motion, cam means carried on the shaft means and motion transmission means between the shaft and the spring means to continuously adjust the force of the spring means as the cam is rotated, and means responsive to axial motion of the shaft means to reset the control device to said one position.

3. A control according to claim 2 in which the shaft means is biased to one position and is movable against its bias to effect resetting of the control device.

4. A control device according to claim 3 in which the cam means acts on the spring means through lever means and the lever means is actuated in the reset direction when the shaft means is actuated axially.

5. A control according to claim 4 in which the motion imparted to the lever means during resetting is greater than the cam means imparts to the lever means as the cam is rotated whereby the lever means is moved beyond the normal maximum spring loading position during resetting, and including means operative during resetting to positively and mechanically move the control device to said one position.

6. A control according to claim 5 in which the lever means includes a cam surface and the cam means is forced against the cam surface during movement of the shaft during resetting whereby the lever means is forced to move.

7. A control according to claim 5 including a link operatively connected to the shaft means and the lever means and actuated by axial movement of the shaft means to actuate the lever means in the reset direction.

8. A pressure switch comprising, a housing, a diaphragm in the housing having a pressure chamber on one side and a switch chamber on the other side, a spring in the switch chamber opposing the pressure acting on the diaphragm, switch means actuated from a first to a second position in response to a selected pressure, means supporting the spring and movable to an extreme position in which the switch means is reset to said first position, a continuously variable cam engaging motion transmission means between the shaft and the spring support means to adjust the spring load, manually operated means mounted for rotational and axial motion and operative to actuate the cam when manually operated means is rotated, and means operative in response to axial motion of the manual means to actuate the spring support means to said extreme position to reset the switch means.

References Cited by the Examiner
UNITED STATES PATENTS

| | | | |
|---|---|---|---|
| 2,648,234 | 8/1953 | Lester | 74—107 X |
| 2,941,055 | 6/1960 | Sussin | 200—83 |

BERNARD A. GILHEANY, *Primary Examiner.*

G. MAIER, *Assistant Examiner.*